United States Patent
Zhang et al.

(10) Patent No.: US 7,515,878 B2
(45) Date of Patent: Apr. 7, 2009

(54) METHOD AND SYSTEM FOR GREEDY USER GROUP SELECTION WITH RANGE REDUCTION FOR FDD MULTIUSER MIMO DOWNLINK TRANSMISSION WITH FINITE-RATE CHANNEL STATE INFORMATION FEEDBACK

(75) Inventors: Chengjin Zhang, La Jolla, CA (US); Jun Zheng, La Jolla, CA (US); Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 383 days.

(21) Appl. No.: 11/232,362

(22) Filed: Sep. 21, 2005

(65) Prior Publication Data

US 2007/0066237 A1    Mar. 22, 2007

(51) Int. Cl.
*H04B 1/00* (2006.01)
*H04M 1/00* (2006.01)

(52) U.S. Cl. .................. 455/69; 455/67.11; 455/513; 455/562.1

(58) Field of Classification Search .............. 455/69, 455/67.11, 101, 115.1, 513, 561, 562.1
See application file for complete search history.

(56) References Cited

U.S. PATENT DOCUMENTS

2004/0095907 A1* 5/2004 Agee et al. .................. 370/334
2005/0265223 A1* 12/2005 Song ........................ 370/208

FOREIGN PATENT DOCUMENTS

CN    1574685    2/2005

OTHER PUBLICATIONS

E. Telatar, "Capacity of multi-antenna gaussian channels," Bell Labs Technical Journal, pp. 1-28, Jun. 1995.
G. J. Foschini, "Layered space-time architecture for wireless communication in a fading environment when using multi-element antennas," Bell Labs Technical Journal, vol. 1, No. 2, pp. 41-59, Autumn 1996.
S. Caire, G. Shamai, "On the achievable throughput of a multiantenna gaussian broadcast channel," IEEE Trans. on Information Theory, vol. 49, No. 7, pp. 1691-1706, Jul. 2003.
C. B. Peel, B. M. Hochwald, and A. L. Swindlehurst, "A vector-perturbation technique for near-capacity multiantenna nultiuser communication—Part I: channel inversion and regularization," IEEE Trans. on Communications, vol. 53, No. 1, pp. 195-202, Jan. 2005.

(Continued)

*Primary Examiner*—Quochien B Vuong
(74) *Attorney, Agent, or Firm*—McAndrews, Held & Malloy, Ltd.

(57) ABSTRACT

Aspects of a greedy search user group selection scheme with range reduction for FDD multiuser MIMO downlink transmission with finite-rate channel state information feedback are provided. The method may comprise receiving feedback information via a communication channel for a plurality of users in a frequency division duplex system. The system capacity may be maximized using the feedback information based on a signal from a single user within a reduced search range or based on the signal from the single user and at least one other signal from another user within a remaining portion of the search range. The feedback information may comprise quantized gain and/or direction of the channel state information of the users.

20 Claims, 7 Drawing Sheets

OTHER PUBLICATIONS

C. Windpassinger, R. F. H. Fischer, T. Vencel, and J. B. Huber, "Precoding in multiantenna and multiuser communications," IEEE Trans. on Wireless Communications, vol. 3, No. 4, pp. 1305-1316, Jul. 2004.

B. M. Hochwald, C. B. Peel, and A. L. Swindlehurst, "A vector-perturbation technique for near-capacity multiantenna multiuser communication—Part II: perturbation," IEEE Trans. on Communications, vol. 53, No. 3, pp. 537-544, Mar. 2005.

T. Yoo and A. J. Goldsmith, "Optimality of zero-forcing beamforming with multiuser diversity," in 2005 IEEE International Conference on Communications, Seoul, Korea, May 2005, pp. 542-546.

D. Gesbert and M. S. Alouini, "How much feedback is multi-user diversity really worth?" in IEEE International Conference on Communications 2004, vol. 1, 2004, pp. 234-238.

S. Sanayei and A. Nosratinia, "Exploiting multiuser diversity with only 1-bit feedback," in IEEE Wireless Communications and Networking Conference 2005, vol. 2, Seattle, 2005, pp. 978-983.

J. C. Roh and B. D. Rao, "Transmit beamforming in multiple antenna systems with finite rate feedback: A VQ-based approach," submitted to IEEE Trans. on Information Theory, 2004.

* cited by examiner

METHOD AND SYSTEM FOR GREEDY USER GROUP SELECTION WITH RANGE REDUCTION FOR FDD MULTIUSER MIMO DOWNLINK TRANSMISSION WITH FINITE-RATE CHANNEL STATE INFORMATION FEEDBACK

CROSS-REFERENCE TO RELATED APPLICATIONS/INCORPORATION BY REFERENCE

This Application makes reference to:
U.S. application Ser. No. 11/232,340 filed Sep. 21, 2005;
U.S. application Ser. No. 11/232,266 filed Sep. 21, 2005;
U.S. application Ser. No. 11/231,501 filed Sep. 21, 2005;
U.S. application Ser. No. 11/231,699 filed Sep. 21, 2005;
U.S. application Ser. No. 11/231,586 filed Sep. 21, 2005;
U.S. application Ser. No. 11/232,369 filed Sep. 21, 2005;
U.S. application Ser. No. 11/231,701 filed Sep. 21, 2005;
U.S. aplication Ser. No. 11/231,557 v filed Sep. 21, 2005; and
U.S. application Ser. No. 11/231,416 filed Sep. 21, 2005.

Each of the above stated application is hereby incorporated by reference in its entirety.

FIELD OF THE INVENTION

Certain embodiments of the invention relate to mobile communication systems. More specifically, certain embodiments of the invention relate to a method and system for greedy user group selection with range reduction for FDD multiuser MIMO downlink transmission with finite-rate channel state information feedback.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multi-antenna receivers, a set of M receive antennas may be utilized to null the effect of (M-1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. This poses problems for wireless system designs and applications. As a result, some initial work on multiple antenna systems may be focused on systems that support single user point-to-point links. Recently, much attention has been focused on utilizing the multi-antenna techniques to a multiuser environment to improve throughput. Multiuser communication systems that employ multiple antennas at the base station may greatly improve the downlink system capacity. The capacity improvement is attained by communicating simultaneously to multiple users through precoding at the transmitter when channel state information (CSIT) is available. A zero-forcing (ZF) linear precoder may achieve the theoretical system sum capacity when the number of users, K, approaches infinity. However, it is not feasible to realize a system in which the number of users approaches infinity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a greedy user group selection with range reduction for FDD multiuser MIMO downlink transmission with finite-rate channel state information feedback, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for greedy user group selection with range reduction for FDD multiuser MIMO downlink transmission with finite-rate channel state information feedback. Aspects of the method may comprise receiving feedback information via a communication channel from a plurality of users in a frequency division duplex system. The system capacity may be maximized using the feedback information based on a signal from a single user within a reduced search range or based on the signal from the single user and at least one other signal from another user within a remaining portion of the search range. The feedback information may comprise quantized gain and/or direction of the channel state information of the users. As used herein, the term "user" may be interpreted to refer to a mobile device.

U.S. application Ser. No. 11/232,369

Figure 1A:
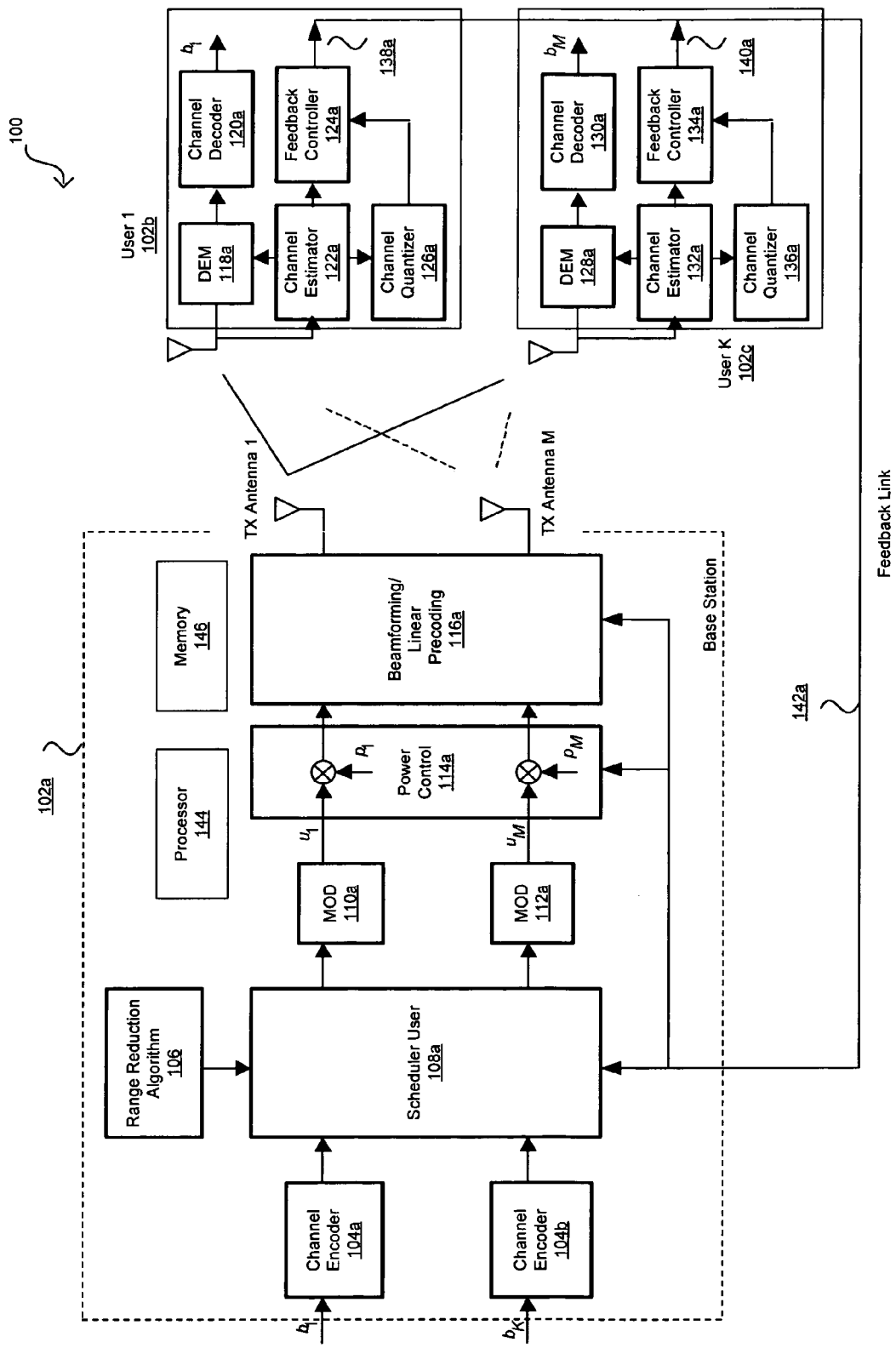
FIG. 1A is a top-level block diagram illustrating an exemplary multiuser multiple-input-multiple-output (MIMO) downlink transmission system with linear preceding, in accordance with an embodiment of the invention.

FIG. 1A is a top-level block diagram illustrating an exemplary multiuser multiple-input-multiple-output (MIMO) downlink transmission system with linear preceding, in accordance with an embodiment of the invention. Referring to FIG. 1A, there is shown a communication system 100 that may comprise a base station 102a and a plurality of users 102b, . . . , 102c. In the communication system 100, the base station 102a may be equipped with M antennas and K users 102b, . . . , 102c may each have a single antenna. In this implementation, the total number of users or receiver antennas may be equal to or higher than the number of base station antennas, that is, $K \geq M$.

The base station 102a may comprise a plurality of channel encoders 104a, . . . , 104b, a range reduction algorithm block 106, a user scheduler 108a, a plurality of modulators (MOD) 110a, . . . , 112a, a power control block 114a, a beamforming or linear preceding block 116a, a processor 144, and a memory 146. Each of the plurality of users 102b, . . . , 102c may comprise one of a plurality of demodulators (DEM) 118a, . . . , 128a, one of a plurality of channel decoders 120a, . . . , 130a, one of a plurality of channel estimators 122a, . . . , 132a, one of a plurality of feedback controllers 124a, . . . , 134a, and one of a plurality of channel quantizers 126a, . . . , 136a.

The channel encoders 104a, . . . , 104b may comprise suitable logic, circuitry, and/or code that may be adapted to encode binary data for each of the K users in the communication system 100. The range reduction algorithm block 106 may comprise suitable logic, circuitry, and/or code that may be adapted to reduce a search range within which a group of signals having maximum channel gain are located. The beamforming or linear preceding block 116a may comprise suitable logic, circuitry, and/or code that may be adapted to processes the user data symbols to separate signals intended for different users such that each of the users receives little or no interference from other users. With M antennas at the base station 102a, the beamforming or linear precoding block 116a may separate at most M different signals, that is, the base station 102a may transmit to at most M users at a time. Therefore, for each channel realization, the base station 102a may need to select M or less than M users among all the K users to transmit.

The user scheduler 108a may comprise suitable logic, circuitry, and/or code that may be adapted to find a best user group that optimizes certain performance criterion such as the sum throughput of the system, for example. In this regard, the user scheduler 108a may be adapted to perform the steps of a greedy search user group selection algorithm to find the best user group. The user scheduler 108a may be adapted to determine a first maximum system capacity based on the first user and a second maximum system capacity based on the second user. The user scheduler 108a may also be adapted to select the highest of the first maximum system capacity and the second maximum system capacity as the maximum system capacity to be supported by the communication system 100. In this regard, for a case when M=2, the user scheduler 108a may select a user group comprising a pair of users associated with the maximum system capacity selected.

The modulators 110a, . . . , 112a may comprise suitable logic, circuitry, and/or code that may be adapted to modulate the binary data of each of the users selected by the user scheduler 108a. In this regard, the modulation operation on the binary data may result in a plurality of complex symbols, for example. The power control block 114a may comprise suitable logic, circuitry, and/or code that may be adapted to allocate different users with different power levels in accordance with their respective channel quality, for example. The user scheduler 108a, the power control block 114a, and/or the beamforming or linear precoding block 116 may require knowledge of the state of the downlink channel.

The processor 144 may comprise suitable logic, circuitry, and/or code that may be adapted to process information and/or data associated with the generation of transmission signals at the base station 102a. The processor 144 may also be adapted to control at least a portion of the operations of the base station 102a. For example, the processor 144 may determine whether to handoff a mobile user to another base station. The memory 146 may comprise suitable logic, circuitry, and/or code that may be adapted to store data and/or control information that may be utilized in the operation of at least a portion of the base station 102a.

The demodulators 118a, . . . , 128a in the users 102b, . . . , 102c may comprise suitable logic, circuitry, and/or code that may be adapted to demodulate the signals received from the base station 102a, for example. The channel decoders 120a, 130a may comprise suitable logic, circuitry, and/or code that may be adapted to decode the demodulated signals from the demodulators 118a, . . . , 128a into binary bit streams, for example. The channel estimators 122a, . . . , 132a may comprise suitable logic, circuitry, and/or code that may be adapted to produce a channel estimate for the signal transmitted by, for example, the base station 102a. The channel quantizers 126a, . . . , 136a may comprise suitable logic, circuitry, and/or code that may be adapted to quantize the channel estimate from, for example, the channel estimators 122a, . . . , 132a to discrete values. This may have the effect of rounding the channel estimates to a small number of quantized values. The feedback controller 124a, . . . , 134a may comprise suitable logic, circuitry, and/or code that may be adapted to generate a feedback signal to, for example, the base station 102a from the channel estimates from the channel estimators 122a, . . . , 132a and the quantized channel estimates from the channel quantizers 126a, . . . , 136a.

Figure 1B:
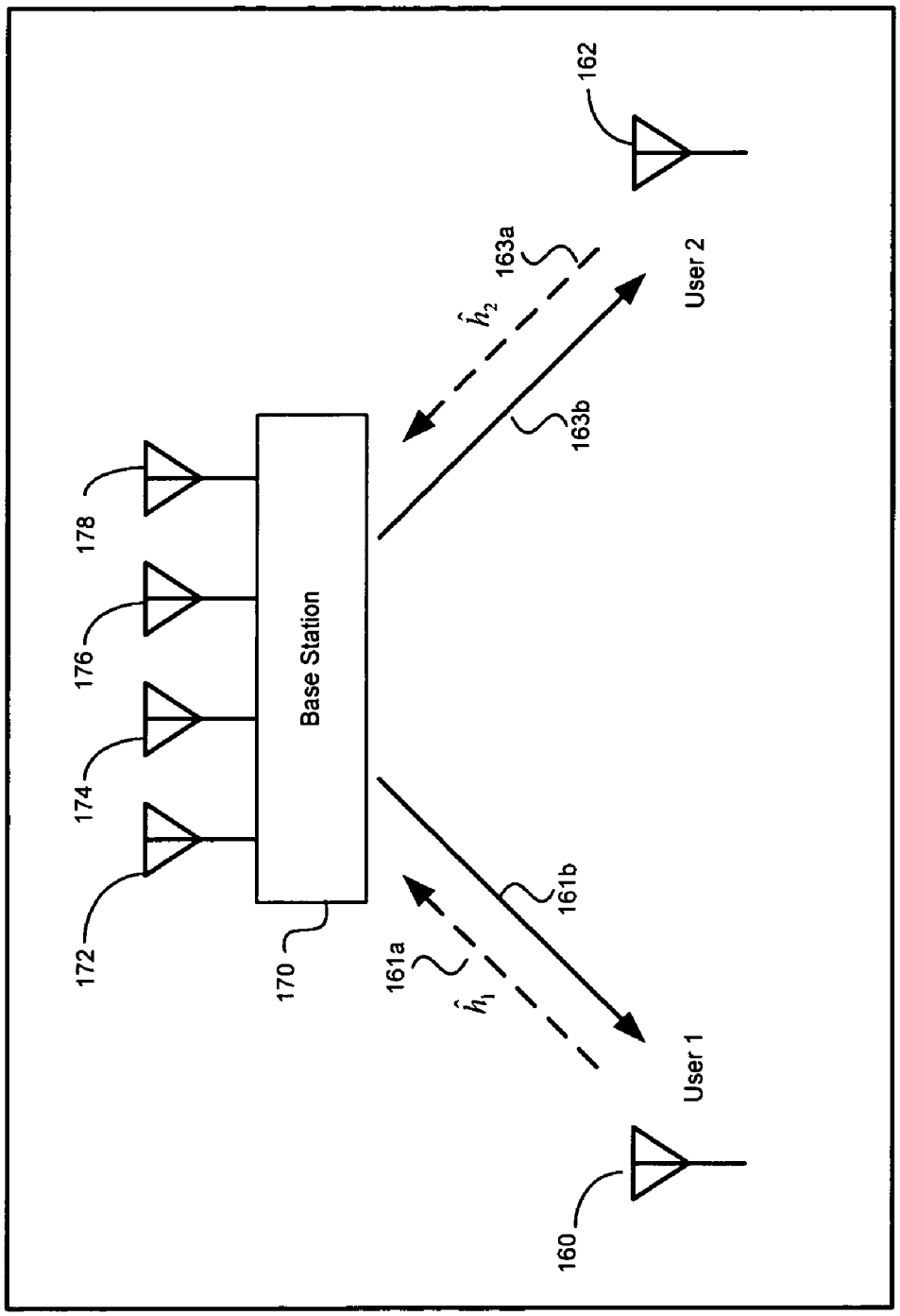
FIG. 1B is a diagram illustrating exemplary communication between the base station and the receivers of FIG. 1A, in accordance with an embodiment of the invention.

FIG. 1B is a diagram illustrating exemplary communication between the base station and the receivers of FIG. 1A, in accordance with an embodiment of the invention. There is shown a base station 170, a first user (user 1) 160, and a second user (user 2) 162. The base station 170 may comprise antennas 172, 174, 176, and 178. The operation of the base station 170 may be substantially similar to the operation of the base station 102a described in FIG. 1A. The operation of the first user 160 and the second user 162 may be substantially similar to the operation of users 102b, . . . , 102c in FIG. 1A. In this regard, the first user 160 and the second user 162 may each have a single antenna.

In this instance, the base station 170 may transmit signals 161b and 163b, for example, and the first user 160 may transmit a feedback signal 161a and the second user 162 may transmit a feedback signal 163a. The signal 161b may be intended to be received by the first user 160.

When the base station 170 is equipped with M antennas and there are K users where each user has a single antenna, the signal model may be expressed as $$\begin{bmatrix} \gamma_1 \\ \gamma_2 \\ \vdots \\ \gamma_K \end{bmatrix} = \begin{bmatrix} h_1 \\ h_2 \\ \vdots \\ h_K \end{bmatrix} x + n \quad (1)$$

where $\gamma_\kappa (\kappa=1, \ldots, K)$ is the signal received by user $\kappa$, $h_\kappa \in \mathbb{C}^{1 \times M}$ is the channel vector to user k, $x \in \mathbb{C}^{M \times 1}$ is the transmitted symbol vector by the base station 170, and $n \in \mathbb{C}^{K \times 1}$ is the additive white Gaussian noise (AWGN) with zero mean and unit variance. The transmitted symbols may satisfy certain power constraint, for example $E[x^H x] \leq P$, where $(\cdot)^H$ represents complex conjugate transpose.

In this exemplary analysis, each element in $h_k$ may be a zero-mean circularly symmetric complex Gaussian (ZMC-SCG) random variable with unit variance. Moreover, the users may experience independent fading and therefore the channel vectors $\{h_k\}_{k=1}^K$ may be statistically independent from each other. The channel state information (CSI), $h_k$ may be known to user k, but may not be known to other users. The base station 170 may have knowledge of the CSI for all users.

This may occur for a frequency division duplex (FDD) system where CSI feedback may be received by the base station 170 from the users.

Employing multiple antennas at the base station in cellular multiuser communication systems may improve the downlink system capacity. This approach may be utilized with any multiuser MIMO system, such as CDMA2000, WCDMA, and Wireless LAN (WLAN), for example. The capacity improvement may be attained by communicating simultaneously to multiple users through precoding at the transmitter or base station when channel state information is available. In this regard, a transmitter or base station may refer to any device or equipment that may be adapted to communicate with multiple other devices, users, and/or receivers. Moreover, user or receiver may refer to user device and/or equipment that may be adapted for communication with a base station and/or other devices. Dirty paper coding (DPC) may be utilized as a precoding scheme that may achieve the sum capacity, however, it may be difficult to implement due to complexity issues. There may also exist other suboptimal but relatively low complexity schemes for multiuser MIMO downlink, such as linear precoding, Tomlinson-Harashima precoding, and vector encoding, for example.

Recently, it has been shown that zero-forcing (ZF) linear precoder may achieve the sum capacity when combined with infinite-order multiuser diversity, that is, when the number of users K approaches infinity. Moreover, ZF precoders may provide near-optimal performance even with a limited number of users, when K=10 for example.

Zero-forcing precoders may be a specific type of linear precoders. When the base station, for example the base station 102a in FIG. 1A, decides to transmit to a group of users $D \subseteq \{1, \ldots, K\}$ with $d = |D| \leq K$ a linear preceding scheme linearly weighs the data symbols, $s = [s_1, \ldots, s_d]^T$, before they are transmitted from the base station, $$x = FPs, \quad (2)$$

where x is the transmitted signal vector as in equation (1), $F = [f_1, \ldots, f_d]$ is the M×d linear precoding matrix with normalized columns ($\|f_k\|=1$), and $P = \text{diag}\{P_1, \ldots, P_d\}$ with $$\sum_{i=1}^{d} P_i \leq P$$

is the power control matrix that allocates transmit power to the different users. The data symbols s may correspond to the data symbols $u_1 \ldots u_M$ that are generated by the plurality of modulators 110a . . . 112a. The elements in the linear preceding matrix F may represent the plurality of weighing coefficients utilized by the precoder 116a. The nonzero elements in the diagonal matrix P may represent the plurality of scaling factors $p_1 \ldots p_M$ utilized by the power control block 114a. The received signal may be given by:

$$\begin{bmatrix} \gamma_1 \\ \gamma_2 \\ \vdots \\ \gamma_d \end{bmatrix} = \begin{bmatrix} h_1 \\ h_2 \\ \vdots \\ h_d \end{bmatrix} FPs + n. \quad (3)$$

A zero-forcing precoder may utilize a pseudo-inverse of the overall channel matrix $H_D = (h_1^T, \ldots, h_d^T)^T$ as the weighting matrix when $H_D$ may have full row rank according to the following equation:

$$W_D = H_D^\dagger = H_D^H (H_D H_D^H)^{-1}, \qquad (4)$$

$$F_D = W_D \begin{bmatrix} \frac{1}{w_1} & & \\ & \ddots & \\ & & \frac{1}{w_d} \end{bmatrix}, \qquad (5)$$

where $\{w_i\}_{i=1}^d$ are the columns of $W_D$. By defining $$\xi_i \triangleq \frac{1}{w_i} \qquad (6)$$

and substituting equation (5) into equation (3), the received signal for each user with zero-forcing precoding may be expressed as, $$\gamma_i = \xi_i P_i s_i + n_i \forall i \in D. \qquad (7)$$

In this regard, the multiuser downlink channel may become a set of parallel channels. The maximum sum rate of the given user group D may be given by the following expression:

$$C_D = \sum_{i \in D} \log(1 + \xi_i P_i), \qquad (8)$$

where the optimal $P_i$ is given by the water-filling solution, $$P_i = \left(\mu - \frac{1}{\xi_i}\right)^+, \qquad (9)$$

with the water level $\mu$ chosen to satisfy $$\sum_{i \in D} \left(\mu - \frac{1}{\xi_i}\right)^+ = P.$$

The maximum achievable sum rate for a given channel realization may be obtained by searching over all the possible user groups, that is, $$C = \max_{D \subseteq \{1,\ldots,K\}, |D| \le M} C_D. \qquad (10)$$

An optimal or best user group selection for ZF precoding may require searching over all $$\sum_{i=1}^M \binom{K}{i}$$

candidate user groups to find the one with the largest sum rate, which leads to a fairly high computational cost. Moreover, in an FDD system, all the channel state information that may be needed at the transmitter to perform the optimal user group search may be obtained from the users through a feedback link, for example, the feedback link 142a. Because the optimal search requires CSI from each user and each user's channel is a complex vector of dimension M, that is equivalent to 2M real numbers per user, heavy burden may be placed on the feedback link 142a to obtain this information. This may be particularly cumbersome since the feedback link 142a may tend to have very limited capacity. A user group selection scheme that results in a simpler implementation and requires less feedback information may be very useful in multiuser communication systems with multiple transmit antennas.

Figure 2:
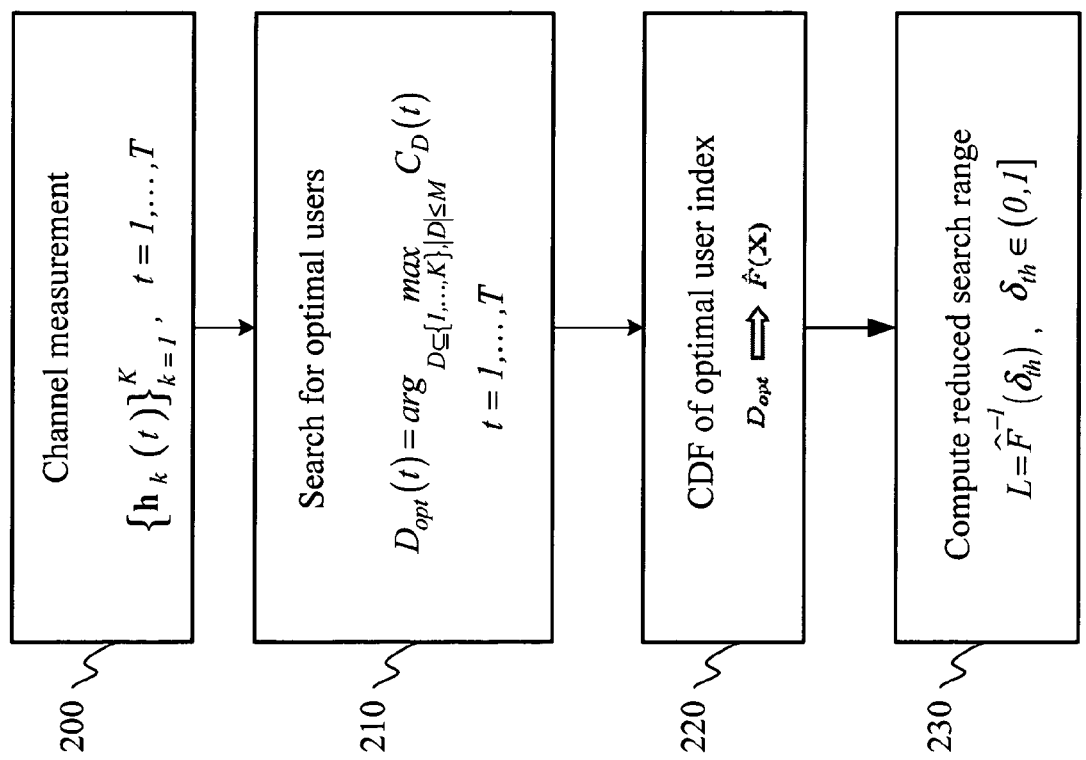
FIG. 2 is a flow chart that illustrates exemplary steps in a method for a range reduction scheme for user selection in a multiuser MIMO downlink transmission, in accordance with an embodiment of the invention.

FIG. 2 is a flow chart that illustrates exemplary steps in a method for a range reduction scheme for user selection in a multiuser MIMO downlink transmission, in accordance with an embodiment of the invention. Referring to FIG. 2, in step 200, channel state information (CSI) may be derived, step 210 comprise a search for optimal users, step 220 may comprise computing a cumulative distribution function (CDF) among user indexes, and step 230 may comprise computing a reduced search range.

In step 200 CSI may be derived based on a plurality of T independent channel realizations, for example:

$$\{h_k(t)\}_{k=1}^K, t=1,\ldots,T. \qquad (11)$$

The CSI may comprise channel gain, or signal gain, information. For each channel realization, users among the full set of K users may be sorted, and indexed, in an order based on the values of the channel gains corresponding to each of the K users. For example, a user with a larger value of corresponding channel gain may be placed in the sorted list at a higher index than a user with a smaller value of corresponding channel gain as in the following expression:

$$\gamma_1(t) \ge \gamma_2(t) \ge \ldots \ge \gamma_K(t), t=1,\ldots,T, \qquad (12)$$

where $$\gamma_k(t) \triangleq \|h_k(t)\|^2. \qquad (13)$$

The channel measurement may be carried out either by offline channel sounding or by online channel estimation. In a FDD system, the downlink CSI may be estimated by the users 102b, ..., 102c and subsequently communicated to the base station 102a via a dedicated feedback link 142a.

In step 210, for each of the channel realizations according to (11), the optimal user group may be determined according to (8) and (10) as in the following expression:

$$D_{opt}(t) = \arg\max_{D \subseteq \{1,\ldots,K\}, |D| \le M} C_D(t), t = 1, \ldots, T, \qquad (14)$$

-continued where $$C_D(t) = \sum_{i \in D} \log(1 + \xi_i(t)P_i(t)), \quad (15)$$

and where $\xi_i(t)$ and $P_i(t)$ may be as defined in equations (6) and (9), respectively. $D_{opt}(t)$ may be represented as a row vector that contains indexes corresponding to the users $102b, \ldots, 102c$ contained in the optimal group for channel realization t. By representing the index of the optimal users as a random variable X, the vector as in the following expression:

$$D_{opt} \triangleq [D_{opt}(1), D_{opt}(2), \ldots, D_{opt}(T)] \quad (16)$$

may contain samples of the random variable X.

In step 220, an estimate of the cumulative distribution function (CDF) $\hat{F}(X)$ of X may be produced based on samples from the optimal user index vector, X, that was determined in step 210 according to equation (16).

In step 230, a threshold, $\delta_{th} \in (0,1]$, may be selected. The reduced search range then be determined by the relationship as in the following expression:

$$L = \hat{F}^{-1}(\delta_{th}), \quad (17)$$

where $\hat{F}^{-1}(\bullet)$ is the inverse function of $\hat{F}(\bullet)$, for example:

$$X = \hat{F}^{-1}(\hat{F}(X)) \quad (18)$$

The threshold may be a measure of the likelihood that the channel realization, evaluated among the full range of K users, will comprise the subset of L users.

In various embodiments of the invention, expression (17) may be implemented by tabulating the CDF $\hat{F}(X)$ in terms of the random variable comprising the index of optimal users X, and searching for a value of X that corresponds to $\delta_{th}$. The threshold $\delta_{th}$ may provide a measure of the statistical likelihood that the sum rate, computed among of subset of L users in the reduced searching range, may approach the optimal performance computed among the full group of K users.

While the exemplary embodiment of the invention illustrates a search range reduction scheme a system that utilizes a simple zero-forcing precoder, the invention is not so limited. Various embodiments of the invention may also be utilized with other more sophisticated precoders, for example a minimum mean squared error (MMSE) precoder, a Tomlinson-Harashima precoding (THP) precoder, or a sphere encoding precoder, for example.

The U.S. application Ser. No. 11/231,699

An embodiment of the invention may use reduced range greedy search user group selection algorithm in a FDD multiuser MIMO downlink channel environment with finite-rate feedback from the user to the base station. In addition to maintaining very low computational complexities, various embodiments of the invention may require very low CSI feedback rate, for example, on the order of a few bits. The user selection algorithm may combine the greedy search user group selection algorithm that may be used by the User Scheduler 108a and the range reduction algorithm that specifies a reduced/smaller user range within which the scheduler searches for the best user group. The User Scheduler 108a, the Power Controller 114a and the Linear Precoder 116a may require knowledge of the state of the downlink channel. In a frequency division duplex (FDD) system, the base station may have to obtain the downlink channel state information through a finite-rate feedback link, for example, the feedback link 142a, from the users, for example, the users 102b, . . . , 102c. Each user may estimate its own channel and quantize the channel according to the feedback rate constraint. Then the feedback controller 124a or 134a at each user may decide what information to feed back on the request of the base station 102a.

Note that since two antennas may be employed in the main third-generation cellular communication standards, such as WCDMA and CDMA 2000, the number of antennas used may be two (M=2). However, the algorithm may easily be extended to any value of M.

Figure 3A:
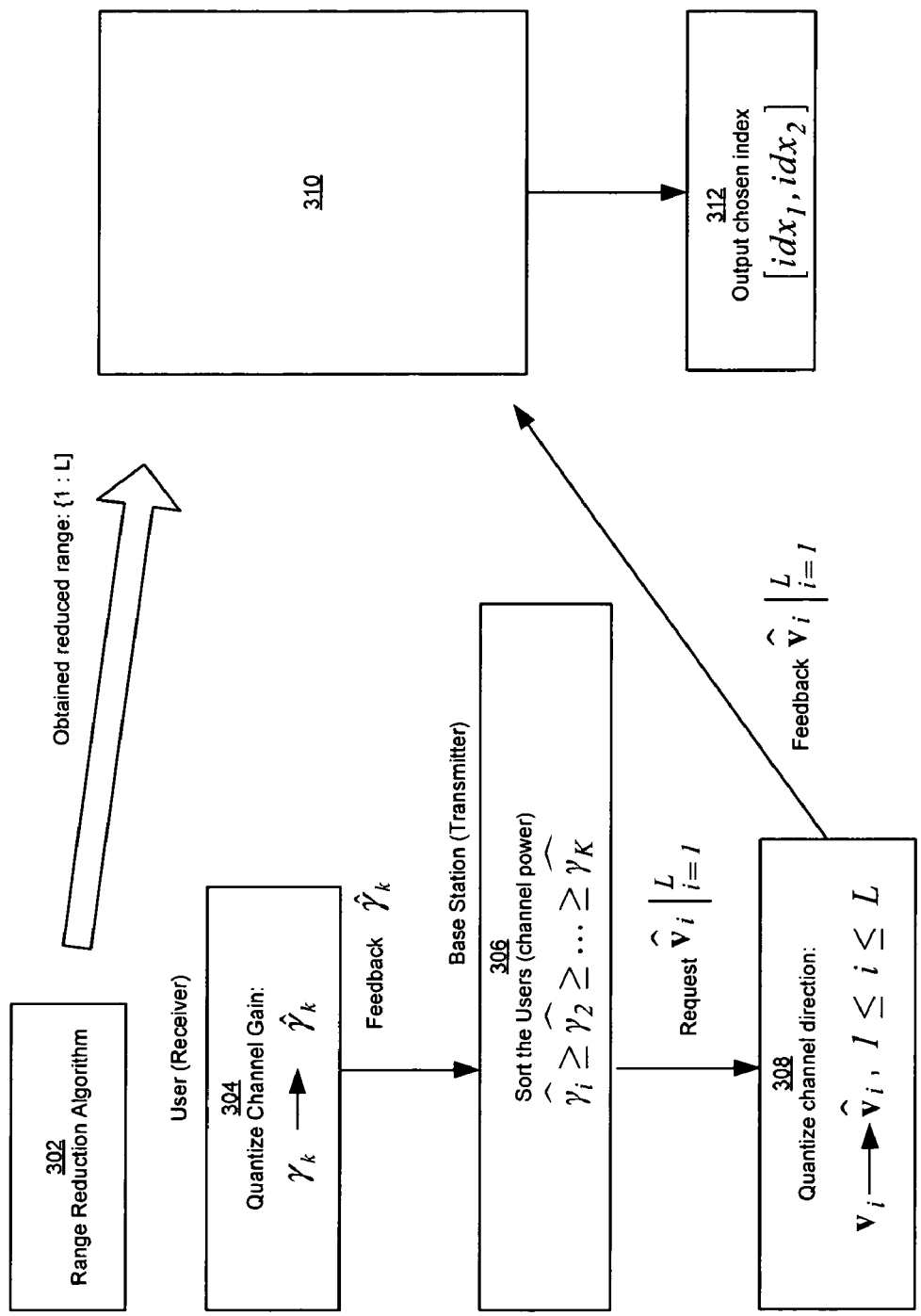
FIG. 3A is a flow diagram illustrating exemplary steps taken by base station for user group selection, in accordance with an embodiment of the invention.

FIG. 3A is a flow chart illustrating exemplary steps for user group selection, in accordance with an embodiment of the invention. Referring to FIG. 3a, in step 302, the range reduction algorithm may be applied to find the reduced user search range L. Thus, the L strongest users may need to be searched to find a desired user group. This step of determining the reduced user search range L will not be described in detail as it was described in detail with respect to FIG. 2. An embodiment of the invention may use an offline-calculated user range as the initial value while updating L at real time with online channel measurements.

It may be assumed that users have ideal channel state information available to receiver (CSIR) such that the multiple-input-single-output (MISO) channel impulse response $h_k \in \mathbb{C}^{1 \times 2}$ (M=2) may be perfectly known at each user. In step 304, each user may quantize its own channel gain (or channel power) $\gamma_k = \|h_k\|^2$ by a finite-rate scalar quantizer with quantization resolution $B_g$ bits per channel update. The quantized channel gain $\hat{\gamma}_k$, or the equivalent quantization index, may then be conveyed back to the base station 102a through a rate constrained or very low bit rate feedback link 142a. The channel gain quantizer may be optimized to match to the precoder used at the transmitter, such as, for example, the zero-forcing precoder. Specific performance metric, such as capacity and bit error rate, as well channel statistical distributions, may also be taken into account so as to improve the system performance.

In step 306, based on the feedback information $\hat{\gamma}_{i=1}^{K}$, all the users may be sorted and indexed in terms of their channel gains, $$\hat{\gamma}_1 \geq \hat{\gamma}_2 \geq \ldots \geq \hat{\gamma}_K \quad (19)$$

Further based on the obtained range [1, L] from step 302, the base station 102a may request the first L strongest users to send back their channel direction $v_i \times h_i / \|h_i\|$.

In step 308, based on the request from the base station 102a, for $1 \leq i \leq L$, the $i^{th}$ user may quantize its own channel direction by a vector quantizer with inner product quantization criterion. The direction vector $v_i$ may hence be quantized into $\hat{v}_i$ with quantization resolution $B_v$ bits per channel update. The quantized vector $\hat{v}_i$, or the quantization index, may be fed back to the base station 102a using the feedback link 142a.

In step 310, the first L strongest users may be searched based on the feedback channel information $$\hat{v}_i|_{i=1}^{L} \quad \text{and} \quad \hat{\gamma}_i|_{i=1}^{L}$$

for a user pair [$idx_1$, $idx_2$] that may have the maximum instantaneous sum capacity. Step 310 is described in more detail with regard to FIG. 3B.

In step 312, based on the result of the search process in step 310, an optimal user pair index [$idx_1$, $idx_2$] may be obtained. There may be two cases for the indices obtained. In the first case, if both $idx_1$ and $idx_2$ are valid indices between 1 and K, then the base station 102a may communicate to both user $idx_1$ and user $idx_2$ at the same time utilizing spatial multiplexing. The transmitter precoding matrix F may be generated using the following expression:

$$F=[\hat{v}_{idx2}^{\perp H} \hat{v}_{idx1}^{\perp H}]/\sqrt{2}. \qquad (20)$$

which may be equivalent to the form given by equation (5).

In the second case, if $idx_2$ is equal to 0, this means that communicating only to the strongest user, for example, the user with index $idx_1$, may provide better sum capacity than using spatial multiplexing. In this case, the preceding matrix F may be chosen to be $$F=\hat{v}_{idx1}^{H}. \qquad (21)$$

Figure 3B:
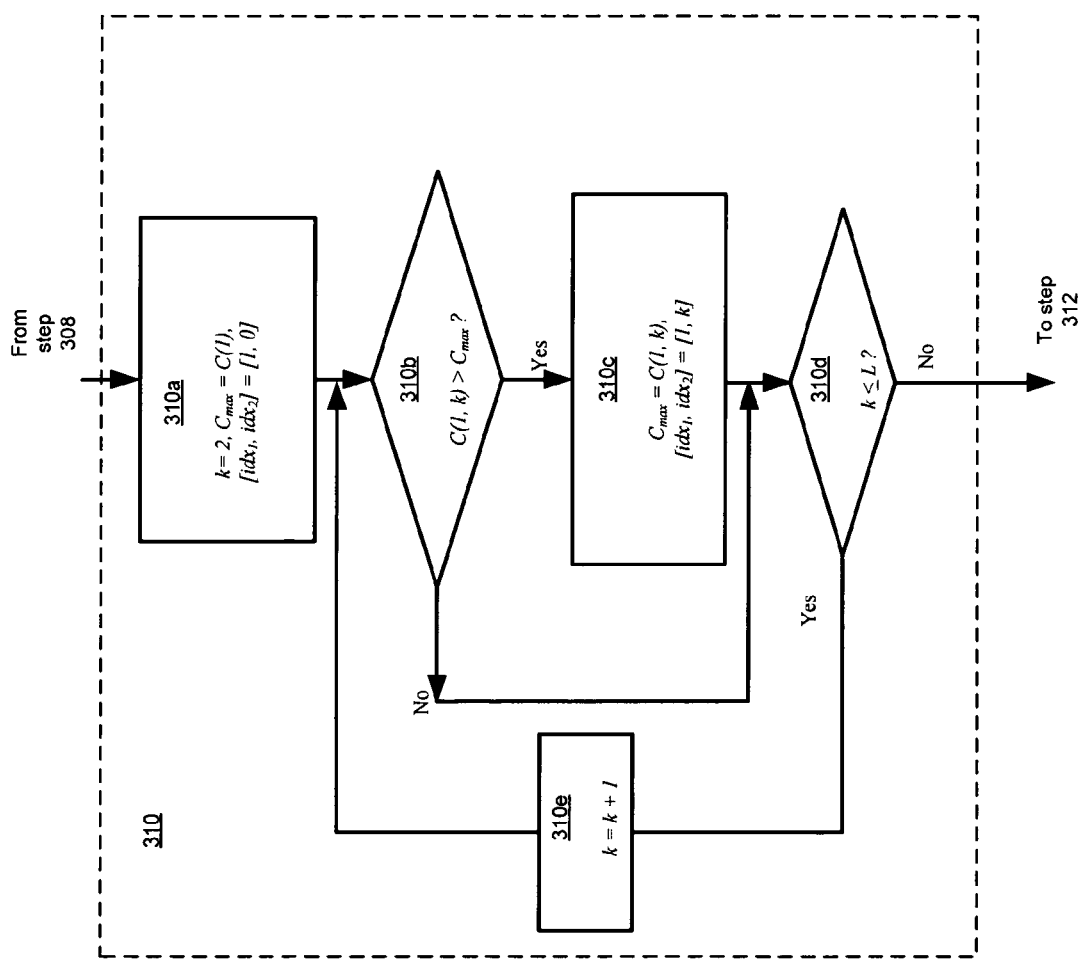
FIG. 3B is a flow diagram illustrating in detail exemplary step 310 taken by base station for user group selection, in accordance with an embodiment of the invention.

FIG. 3B is flow chart illustrating one of the exemplary steps of FIG. 3A, which is utilized for user group selection, in accordance with an embodiment of the invention. Referring to FIG. 3B, there is shown a more detailed description of step 310 of FIG. 3A comprising steps 310a, 310b, 310c, 310d, and 310e. The step 310 may describe greedy search user group selection. In one embodiment of the invention, step 310 may use a for-loop to obtain the optimal user pair. In step 310a, the maximum system capacity $C_{max}$ may be initialized to $C_{max}=C(1)$, which may correspond to the case where the base station 102a may only transmit to the strongest user as given by the following expression:

$$C_{max}=C(1)=\log_2(1+\rho \cdot \hat{\gamma}_1). \qquad (22)$$

The optimal user index may be initialized to [$idx_1$, $idx_2$]=[1, 0] with $idx_2=0$ indicating that there is no second user. A count variable k may be set to 1.

The for-loop may start with step 310b, and may comprise steps 310c, 310d, and 310e. In step 310b, a system maximum sum capacity $C_{max}$, with C(1,k) may be compared to the system maximum sum capacity $C_{max}$, with C(1,0). The system maximum sum capacity $C_{max}$, with C(1,k) may be given by the following expression:

$$C(1,k) = \log_2\left(1+\frac{1}{2}\rho \cdot \hat{\gamma}_1 \cdot \alpha_{1,k}\right) + \log_2\left(1+\frac{1}{2}\rho \cdot \hat{\gamma}_k \cdot \alpha_{1,k}\right) \qquad (23)$$
$$k=2,\ldots,L,$$

where $\rho$ may be the average SNR of the system, and $\alpha_{1,k}$ may be a parameter that describes orthogonality between $\hat{v}_1$ and $\hat{v}_k$, $$\alpha_{1,k} = 1 - |\langle \hat{v}_1, \hat{v}_k \rangle|^2 \qquad (24)$$

If the system capacity C(1,k) is larger than the current maximum capacity $C_{max}$, the next step may be step 310c. Otherwise, the next step may be step 310d. In this regard, the system maximum sum capacity $C_{max}$ may correspond to the transmit data rate of the system when transmitting to either one user as indicated by [$idx_1$, $idx_2$]=[1,0] or two users as indicated by [$idx_1$, $idx_2$]=[1,k].

In step 310c, $C_{max}$ may be updated with C(1,k) and the optimal user index [$idx_1$,$idx_2$] may updated by [1,k]. In step 310d, the count variable k may be compared to L. If the count variable k is greater than L, the next step may be step 312, otherwise the next step may be 310e. In step 310e, the count variable k may be incremented by one, and the next step may be step 310b.

The for-loop comprising the steps 310b, 310c, 310d, and 310e may examine all possible user pairs [1,k] with k=2, ..., L and at the end of the search algorithm, an optimal user pair index [$idx_1$, $idx_2$] that may result in a maximum system sum capacity.

Figure 4:
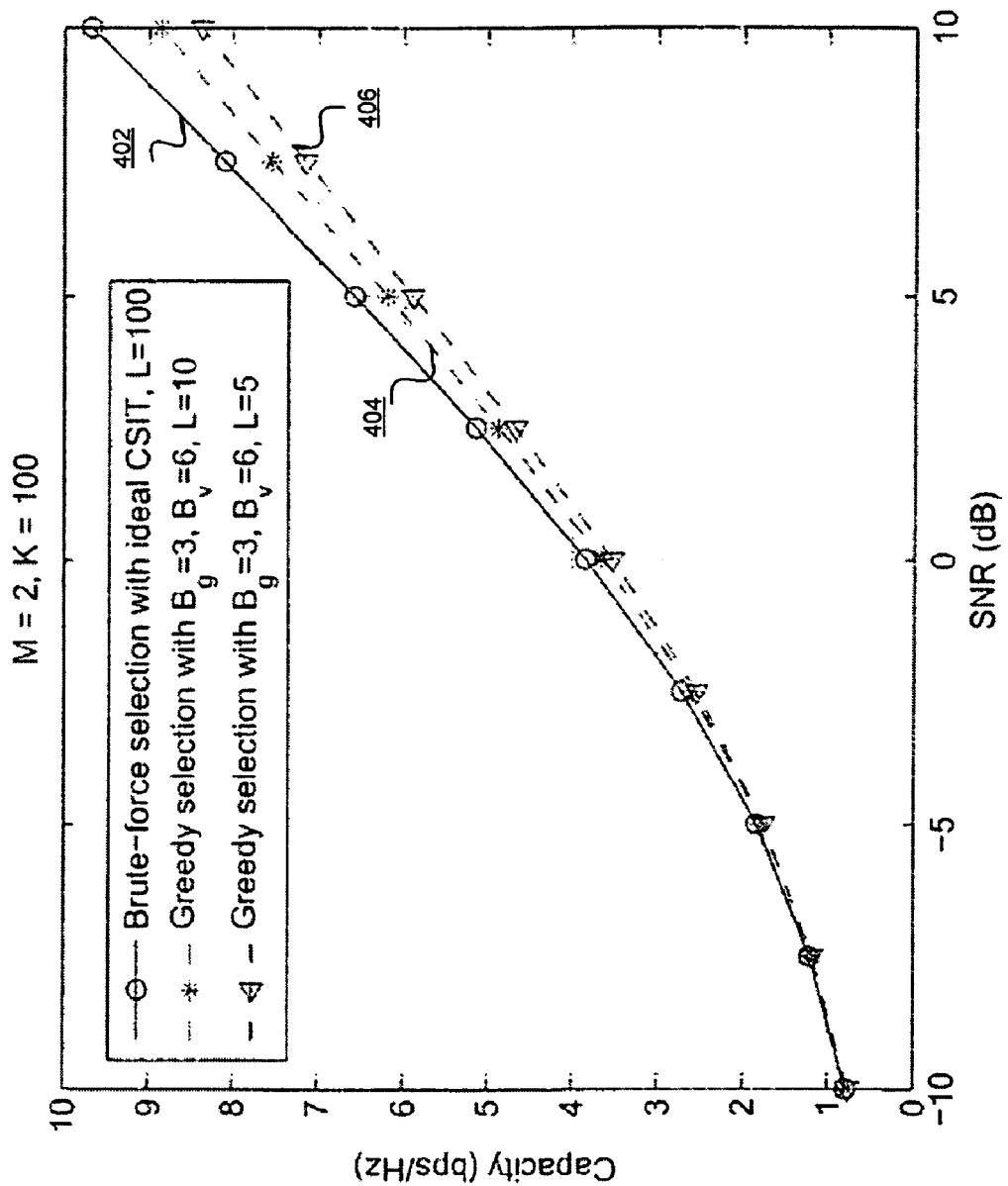
FIG. 4 is a graph that illustrates exemplary downlink transmission schemes in terms of sum rate, in accordance with an embodiment of the invention.

FIG. 4 is a graph that illustrates exemplary downlink transmission schemes in terms of sum rate, in accordance with an embodiment of the invention. Referring to FIG. 4, there is shown the results of a numerical simulation corresponding to the sum rate of a cellular system with a single base station and K=100 users. The base station may be equipped with M=2 antennas, for example, and each user may be equipped with a single antenna. The channels are flat Rayleigh faded channels. The transmit antennas at the base station may be spaced or separated so as to experience independent fading. The modulation format applied may be quadrature phase-shift keying (QPSK), for example.

FIG. 4 may provide three results. The first result may be a signal 402 that may correspond to the rate sum of a brute force selection with ideal CSI at transmitter (CSIT) and a user set of 100 users. The second result may be a signal 404 that may correspond to the rate sum of the greedy search user group selection algorithm with 3 bits allocated for channel gain feedback ($B_g$=3), 6 bits allocated for channel directional feedback ($B_v$=6), and a reduced search range of 10 strongest users (L=10). The third result may be a signal 406 that may correspond to the rate sum of the greedy search user group selection algorithm with 3 bits allocated for channel gain feedback ($B_g$=3), 6 bits allocated for channel directional feedback ($B_v$=6), and a reduced search range of 5 strongest users (L=5).

Figure 5:
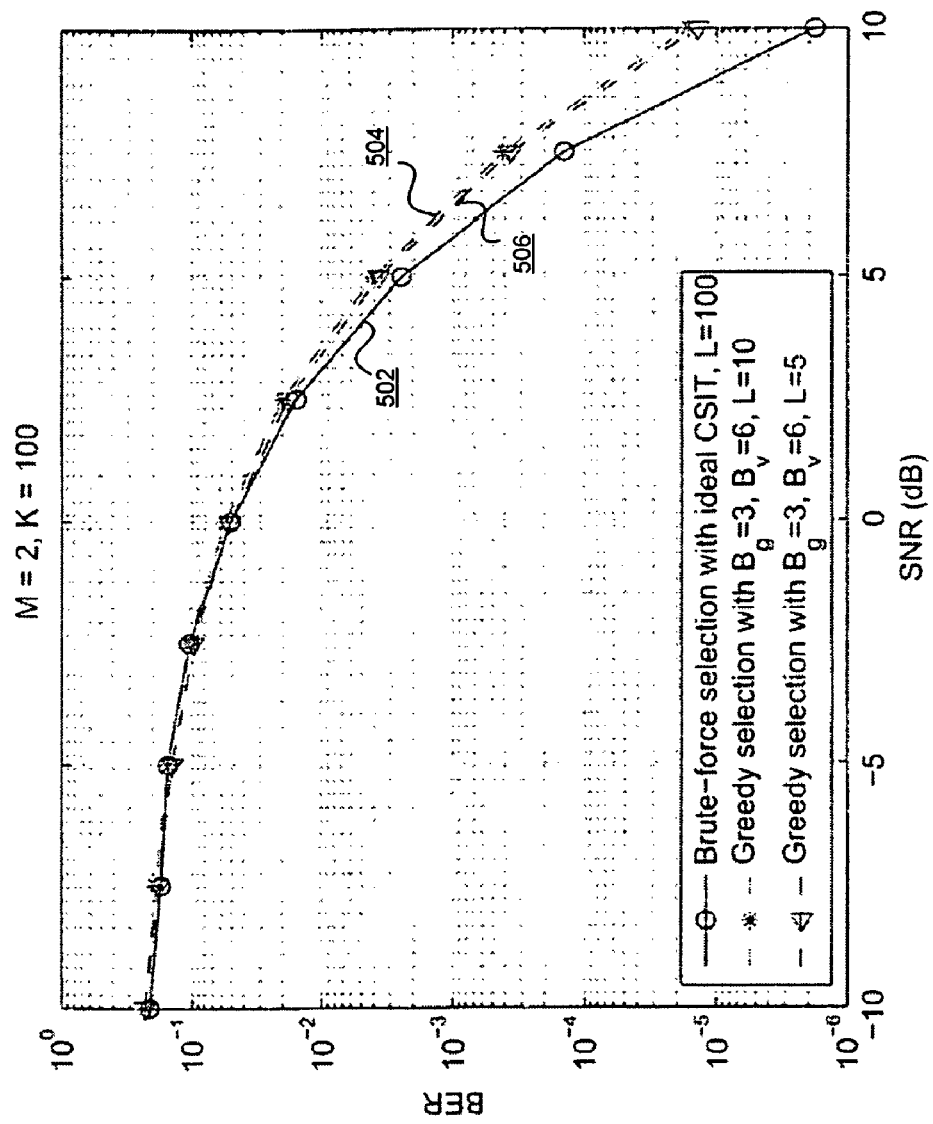
FIG. 5 is a graph that illustrates exemplary downlink transmission schemes in terms of bit error rate, in accordance with an embodiment of the invention.

FIG. 5 is a graph that illustrates exemplary downlink transmission schemes in terms of bit error rate, in accordance with an embodiment of the invention. Referring to FIG. 5, there is shown the results of a numerical simulation corresponding to the sum rate of a cellular system with a single base station and K=100 users. The base station may be equipped with M=2 antennas, for example, and each user may be equipped with a single antenna. The channels are flat Rayleigh faded channels. The transmit antennas at the base station may be spaced or separated so as to experience independent fading. The modulation format applied may be quadrature phase-shift keying (QPSK), for example.

FIG. 5 may provide three results. The first result may be a signal 502 that may correspond to the BER of the brute force selection with ideal CSI at transmitter (CSIT) and s user set of 100 users. The second result may be a signal 504 that may correspond to the BER of the greedy search user group selection algorithm with 3 bits allocated for channel gain feedback ($B_g$=3), 6 bits allocated for channel directional feedback ($B_v$=6), and a reduced search range of 10 strongest users (L=10). The third result may be a signal 506 that may correspond to the BER of the greedy search user group selection algorithm with 3 bits allocated for channel gain feedback ($B_g$=3), 6 bits allocated for channel directional feedback ($B_v$=6), and a reduced search range of 5 strongest users (L=5).

The graphs of FIGS. 4 and 5 may indicate that the greedy search user group selection algorithm with a reduced search range of L=10 or L=5 may provide very similar capacity and/or BER performance as the optimal brute-forcing search scheme with a full search range L=100. However, the brute-forcing search algorithm needs to search over $$\frac{L(L+1)}{2}$$

user groups for M=2, whereas the greedy search user group selection algorithm may have L−1 user groups. This is summarized in Table 1 below. Therefore, the user selection technique may be capable of achieving near-optimal performance while significantly reducing the computational burden on the base station 102a.

Additionally, in a frequency division duplex (FDD) system where the base station 102a may have to obtain the CSI from the users 102b, . . . , 102c through the feedback link 142a, the amount of feedback may be reduced because the base station 102a may only need to have full knowledge of the L strongest users instead of all the K users. If, for each user's channel $h_k$, $B_g$ bits are used to quantize its gain $\|h_k\|^2$ and $B_v$ bits to quantize its direction $$\frac{h_k}{\|h_k\|},$$

the total amount of feedback may be given by:

$$B = K \cdot B_g + L \cdot B_v. \quad (25)$$

Additionally, $B_v$ may be much larger than $B_g$ in practical systems. Therefore, reducing L may save a significant amount of feedback needed by the base station 102a. Table 1 gives a summary of the amount of feedback for various choices of L when $B_g$=2 bits and $B_v$=6 bits.

TABLE 1

| | Selection Schemes M = 2, K = 100, $B_g$ = 2 bits, $B_v$ = 6 bits | | |
|---|---|---|---|
| | Brute Force L = 100 | Greedy Search L = 10 | Greedy Search L = 5 |
| # of Candidate User Groups | 5050 | 9 | 4 |
| Feedback Amount B(bits) | 800 | 260 | 230 |

One embodiment of the invention may comprise receiving feedback information via a communication channel for a plurality of users in a frequency division duplex system. The system capacity may be maximized using the feedback information based on a signal from a single user within a reduced search range or based on the signal from the single user and at least one other signal from another user within a remaining portion of the search range. The feedback information may comprise quantized gain and/or direction of the channel state information of the users.

The search range reduction may be executed by the range reduction algorithm block 106. The range reduction algorithm block 106 may calculate the reduced user search range L. An embodiment of the invention may use an offline-calculated user range as the initial value while dynamically updating L at real time with online channel measurements. The group of signals may be transmitted by the users 102b, . . . , 102c. The feedback information may comprise quantized gain for the signals and may be fed back from the receiving user devices via the feedback link 142a. Quantized channel information, which may comprise quantized channel direction, may be requested for the users within the reduced search range, and the quantized channel direction may be received.

A greedy search user group selection may be performed in order to determine at least one user that may be utilized to maximize the system capacity. The system capacity maximization may comprise determining a second user. Accordingly, the maximized system capacity may be with respect to a first user, or with respect to a first user and a second user. The greedy search user group selection may be described with respect to FIG. 3B. For the greedy search user group selection, a first user may be selected by the user scheduler 108a that corresponds to a channel gain that may be greater than a channel gain of other users within the reduced search range. The user scheduler 108a may maximize system capacity based on the channel state information of the first user and/or the second user. A system capacity may be maximized based on the channel gain corresponding to the first user and/or the second user. A first pair of receivers associated with the maximized system capacity may be selected by the user scheduler 108a. Downlink transmission by the base station 102a may communicate data to the selected receivers.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system comprising a base station and a plurality of user devices, the method comprising:

receiving feedback information via a communication channel from the plurality of user devices in a frequency division duplex system;

determining a reduced search range that comprises a subset of said plurality of user devices based on said received feedback information; and maximizing system capacity based on selecting a user device with a best channel performance within said reduced search range in combination with one or more user devices selected from remaining ones of said reduced search range, wherein said feedback information comprises information on said channel performance, wherein the base station has a plurality of transmit antennas, wherein the number of transmit antennas is equal to the number of user devices selected to maximize system capacity.

2. The method according to claim 1, wherein said feedback information comprises quantized gain for said plurality of signals.

3. The method according to claim 2, comprising:
requesting quantized channel information for user devices within said reduced search range,
wherein said requested quantized channel information comprises quantized channel direction for said user devices within said reduced search range.

4. The method according to claim 1, wherein said reduced search range comprises a first number of user devices from which a second number of user devices is selected to maximize system capacity, wherein the second number is equal to the number of transmit antennas of the base station, and wherein the first number is a function of a cumulative distribution function.

5. The method according to claim 1, comprising receiving quantized channel direction for said user devices within said reduced search range.

6. The method according to claim 5, comprising:
selecting, from a plurality of user devices within said reduced search range, a first user device corresponding to a channel gain that is greater than a channel gain corresponding to a remaining portion of said plurality of user devices within said reduced search range; and
maximizing said system capacity based on said selected first user device.

7. The method according to claim 6, comprising maximizing system capacity based on said channel gain corresponding to said selected first user device.

8. The method according to claim 7, comprising selecting a pair of receivers associated with said maximized system capacity.

9. The method according to claim 1, comprising calculating an initial number of signals in said reduced search range and/or calculating dynamically a number of signals in said reduced search range.

10. The method according to claim 1, wherein the communication system is part of one or more of the following: a CDMA system and/or a wireless LAN system.

11. A system for processing signals in a communication system, the system comprising:
circuitry in a base station that receives feedback information for a plurality of K user devices in a frequency division duplex system,
wherein the base station has M transmit antennas,
wherein K and M are integers and K is greater than M and M is greater than one,
wherein said circuitry enables determination of a reduced search range that defines a subset of L user devices of said K user devices based on said received feedback information,
wherein L is an integer that is less than K,
wherein the L user devices have the highest respective channel gains of the K user device, and
wherein said circuitry maximizes system capacity based on selecting a user device with a best channel performance from the L user devices and selecting M-1 user devices of the L user devices that together maximize system capacity, wherein said feedback information comprises information on said channel performance.

12. The system according to claim 11, wherein said feedback information comprises quantized gain for said plurality of user devices.

13. The system according to claim 12,
wherein said circuitry requests quantized channel information for user devices within said reduced search range, and
wherein said requested quantized channel information comprises quantized channel direction for said user devices within said reduced search range.

14. The system according to claim 11, wherein said circuitry computes a cumulative distribution function and then computes the reduced search range based on the cumulative distribution function.

15. The system according to claim 11, wherein said circuitry receives quantized channel direction for said user devices within said reduced search range.

16. The system according to claim 15, wherein:
said circuitry selects, from a plurality of user devices within said reduced search range, a first user device corresponding to a channel gain that is greater than a channel gain corresponding to a remaining portion of said plurality of user devices within said reduced search range; and
said circuitry maximizes said system capacity based on said selected first signal.

17. The system according to claim 16, wherein said circuitry maximizes system capacity based on said channel gain corresponding to said selected first user device.

18. The system according to claim 17, wherein said circuitry selects a pair of receivers associated with said maximized system capacity.

19. The system according to claim 11, wherein said circuitry calculates an initial number of signals in said reduced search range and/or wherein said circuitry calculates dynamically a number of signals in said reduced search range.

20. The system according to claim 11, wherein said circuitry comprises a Tomlinson-Harashima precoding precoder or a sphere encoding precoder.

* * * * *

UNITED STATES PATENT AND TRADEMARK OFFICE
CERTIFICATE OF CORRECTION

PATENT NO. : 7,515,878 B2 Page 1 of 1
APPLICATION NO. : 11/232362
DATED : April 7, 2009
INVENTOR(S) : Chengjin Zhang, Jun Zheng and Pieter van Rooyen It is certified that error appears in the above-identified patent and that said Letters Patent is hereby corrected as shown below:

Column 3, line 52 after "U.S. application Serial No. 11/232,369" insert --filed on September 21, 2005 provides a method and system for a double search user group selection scheme with range reduction for FDD multiuser MIMO downlink transmission with finite-rate channel state information feedback. In this regard, a double search user group selection with range reduction for maximizing system capacity is provided by that application. The present application discloses using a greedy search user group selection with range reduction for maximizing system capacity. An exemplary implementation of a greedy search user group selection scheme is described in "Optimality of zero-forcing beamforming with multiuser diversity," by T. Yoo and A. J. Goldsmith, 2005 IEEE International Conference on Communications, Seoul, Korea, May 2005, pp. 542-546. The relevant portions of which are hereby incorporated herein by reference. The greedy search generally refers to methods for choosing users from a user group that possess the strongest signal gain.--.

Column 9, line 35 after "The U.S. application Ser. No. 11/231,699" insert --provides a detailed description of the range reduction algorithm for user group selection, described in part in flow diagram of FIG. 2, and is hereby incorporated herein by reference in its entirety.--.

Signed and Sealed this

Fourth Day of August, 2009

JOHN DOLL
*Acting Director of the United States Patent and Trademark Office*